G. LAPENDA.
VALVE OR COCK.
APPLICATION FILED DEC. 5, 1919.
1,342,051. Patented June 1, 1920.
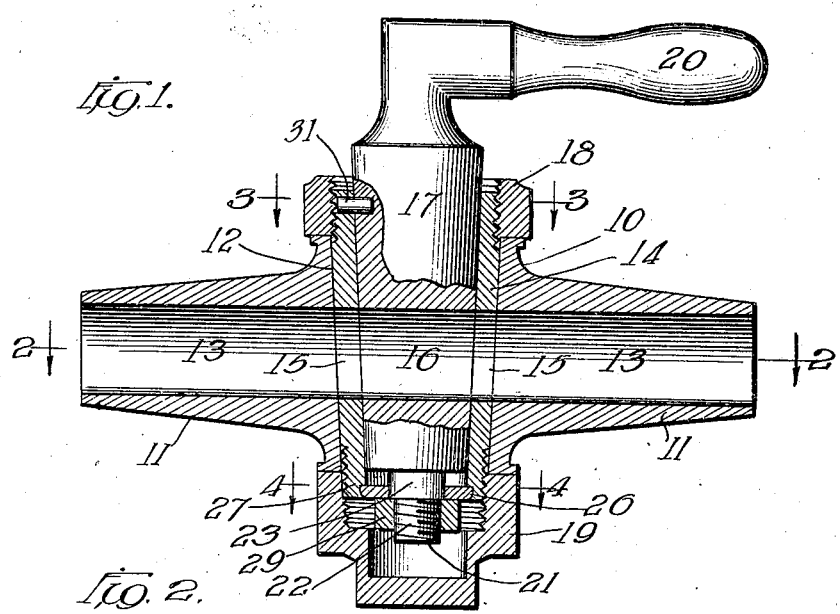
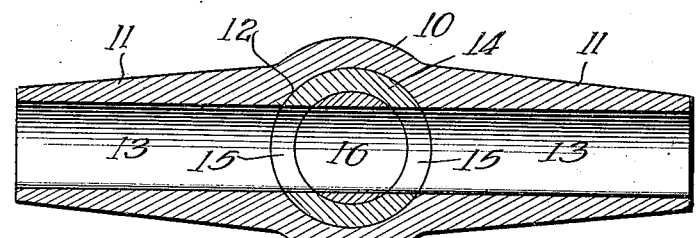
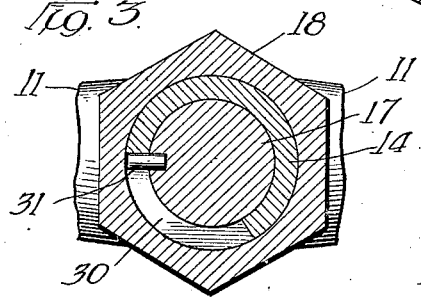
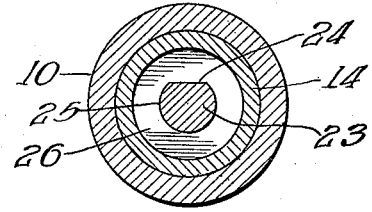
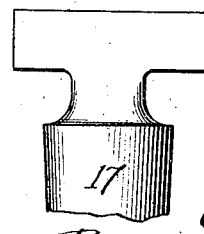
Witnesses:
Harry R. L. White
W. P. Kilroy
Inventor:
George Lapenda
By Chas. C. Tillman Atty.

UNITED STATES PATENT OFFICE.

GEORGE LAPENDA, OF CHICAGO, ILLINOIS.

VALVE OR COCK.

1,342,051.  Specification of Letters Patent.  Patented June 1, 1920.

Application filed December 5, 1919. Serial No. 342,593.

*To all whom it may concern:*

Be it known that I, GEORGE LAPENDA, a citizen of the United States, residing at Chicago, in the county of Cook and State of Illinois, have invented certain new and useful Improvements in Valves or Cocks, of which the following is a specification.

This invention relates to improvements in valves, and more particularly to that kind or character generally known and referred to as stop-cocks, adapted for use in plumbing, gas and steam fitting and in fact almost any kind of pipes employed for conducting fluids or liquids, and it consists in certain peculiarities of the construction, novel arrangement, combination and operation of the various parts thereof, as will be hereinafter more fully set forth and specifically claimed.

The principal object of the invention is to provide a valve of the above named general character, which shall be simple and inexpensive, compact in form, strong, durable and effective in operation, and wherein the plug or valve of the device can be readily adjusted or tightened, especially, where the space in which the device is located is restricted or limited in its confines. Another object is to so construct the device that the plug or valve thereof and its sleeve can be easily removed from the valve casing for repairs or for renewal of like parts, while the casing remains in its proper position with respect to the pipes with which it is connected. A further object is to provide simple and effective means for limiting the rotary movement of the plug or valve.

Various other objects and advantages of the invention will be set forth in the following description and explanation.

In the accompanying drawing, which serves to illustrate an embodiment of the invention, Figure 1 is a vertical central sectional view through the valve showing the parts thereof in their operative positions and illustrating the valve or plug of the device open.

Fig. 2 is a plan sectional view taken on line 2—2 of Fig. 1 looking in the direction indicated by the arrows.

Fig. 3 is a similar view taken on line 3—3 of Fig. 1 as indicated by the arrows.

Fig. 4 is a like view taken on line 4—4 of Fig. 1, and

Fig. 5 is a fragmental view of the upper portion of the plug or valve of the device showing a modified form thereof.

Like numerals of reference refer to corresponding parts throughout the different views of the drawing.

The reference numeral 10 designates the valve casing, which may be made of any suitable size, form and material, but preferably of metal and of substantially the shape shown, that is, a circular central portion having oppositely disposed hollow extensions 11 to each of which a pipe, not shown, may be fitted in any suitable manner for the conveyance of liquids or fluids.

As shown, the casing 10 is provided with a tapered opening 12 which intersects the openings or channels 13 of the extensions 11 and extends longitudinally through the central or circular portion of the casing. Located in the tapered opening 12 is a removable and tapered sleeve 14 which has each of its ends externally screw-threaded and is provided between its ends with opposed openings 15 which are adapted to register with the openings or channels 13 of the extensions 11 as well as with a transverse opening or port 16 with which the valve or plug 17 is provided between its ends.

The removable sleeve 14 is correspondingly tapered on its outer surface with a tapered opening 12 in the valve casing and has its cavity tapered in the same direction as its external taper and in correspondence with the taper of the valve or plug 17. As shown, the sleeve 14 is of sufficient length to project from the ends of the openings 12 in the casing and each of these projecting portions of said sleeve is screw-threaded, one of them being for the engagement of a nut 18 to be used for loosening or removing the sleeve, and the other projecting end for engagement with a cap nut 19 employed for adjusting or tightening the sleeve in position within the casing. The nuts 18 and 19 may be of any suitable shape, so as to be readily turned by means of a wrench or other suitable instrument. The tapered plug or valve 17 may be provided at one of its ends with a handle 20 to be used for turning said valve and has on its other end a reduced extension 21 a portion of which is screw-threaded as at 22, while a part 23 of said extension is without threads and is provided with a cut-away portion 24, see Fig. 4, to provide a flat surface to engage an opening 25 in a washer 26 which opening is of a similar shape to the cross-sectional shape of the extension 23 so as to prevent the washer turning on said extension.

As is clearly shown in Fig. 1 of the drawing, the washer 26 engages a shoulder 27 on the inner surface of the sleeve 14 at its end on which the cap nut 19 is mounted. Engaging the screw-threaded portion 22 of the extension 21 is a nut 29 which when screwed up will hold the washer 26 tightly against the shoulder 27 of the sleeve 14 and will also hold the valve or plug 17 with a working fit in said sleeve. The upper end of the sleeve 14 is by preference provided with a segmental cut-away portion 30 of about 90 degrees, which is for the reception and operation of a stop pin 31 with which the upper portion of the valve or plug 17 is provided from which valve said pin extends laterally.

By this arrangement, it is apparent that the sleeve 14 can be so located in the opening 12 of the valve casing that one end of said cut-away part will be positioned on a line drawn diametrically through one of the openings 15 of the sleeve while the other end of said cut-away portion will be positioned at about a right angle thereto, so that when the valve or plug 17 is rotated one quarter of a turn in one direction, its opening or port 16 will register with the openings 15 and 13 of the sleeve 14 and extensions 11 respectively for the passage of water or fluid, and so that when turning said valve in an opposite direction until the pin 31 strikes the opposite end of the cut-away portion 30 the said ports or openings will be closed and the flow of liquid or fluids shut off.

While I have shown in Fig. 1 of the drawings a rotary valve 17 provided with a laterally extended handle fixed thereto, yet I desire it to be understood that I may equip said valve with any suitable means for turning the same, for instance, I may provide it at one of its ends with a T-shaped handle or head as shown in Fig. 5 of the drawing.

By my improvements, it is apparent that the device can be located within a wall and that so long as access is afforded for the removal of the nut 18 and the cap nut 19 the parts of the device can be detached or disassembled without interfering in the least with the position of the valve casing. It is also evident that the device can be located with its portion on which the cap nut 19 is mounted quite close to a floor or wall without preventing detachment disassembling of the parts thereof, for it is obvious, that only enough space between the outer end of the cap nut 19 and the floor or wall to allow said nut to be unscrewed from the sleeve 14 and removed, will be required.

After the cap nut has been removed in any instance, all that is necessary to detach the other parts of the device is, to unscrew the nut 29 and remove the washer 26 from the extension 21 of the valve or plug 17, when it is apparent that by applying pressure to the free end of the extension 21 or by tightening the nut 18 against the portion of the valve casing 10 adjacent thereto the plug casing and its sleeve can be quickly and easily removed from the casing.

Having thus fully described my invention, what I claim as new and desire to secure by Letters Patent is—

1. In a valve, the combination with a casing having inlet and outlet openings intersected by a tapered opening, of a tapered sleeve located in said tapered opening and having inlet and outlet openings to register with those of the casing and provided at its ends with external screw threads, said sleeve being of sufficient length to extend through each end of the tapered opening in the casing, a tapered plug or valve having a transverse port to register with the openings of said sleeve rotatably mounted in the sleeve, said plug having at one of its ends a reduced extension partly screw-threaded, a washer surrounding the unthreaded portion of said extension and engaging said sleeve, a nut engaging the screw-threaded portion of said extension to hold said washer in position, a cap nut engaging the projecting end of the sleeve adjacent to said extension, and another nut engaging the opposite end of said sleeve.

2. In a valve, the combination with a casing having inlet and outlet openings intersected by a tapered opening, of a tapered sleeve located in said tapered opening of the casing and having inlet and outlet openings to register with those of the casing and provided at its ends with external screw threads, said sleeve having at one of its ends a segmental cut-away portion and being of sufficient length to extend through each end of the tapered opening in the casing, a tapered plug or valve having a transverse port to register with the openings of said sleeve and rotatably mounted in the sleeve, said plug having near one of its ends a lateral stop pin located in the cut-away portion of the sleeve and at its other end a reduced extension partly screw-threaded, a washer surrounding the unthreaded portion of said extension and engaging said sleeve, a nut engaging the screw-threaded portion of said extension to hold said washer in position, a cap nut engaging the projecting end of the sleeve adjacent to said extension, and another nut engaging the opposite end of said sleeve.

GEORGE LAPENDA.